US009973912B1

(12) United States Patent
Virhiä

(10) Patent No.: US 9,973,912 B1
(45) Date of Patent: May 15, 2018

(54) STACKABLE COMMUNICATIONS DEVICE FOR SENSOR INFORMATION PROCESSING AND DELIVERY

(71) Applicant: Zen-me Labs Oy, Tampere (FI)

(72) Inventor: Toni Matti Virhiä, Tampere (FI)

(73) Assignee: Zen-me Labs Oy, Tampere (FI)

( * ) Notice: Subject to any disclaimer, the term of this patent is extended or adjusted under 35 U.S.C. 154(b) by 0 days. days.

(21) Appl. No.: 15/475,914

(22) Filed: Mar. 31, 2017

(51) Int. Cl.
*H04W 4/00* (2018.01)
*H04W 24/02* (2009.01)
*H04W 52/02* (2009.01)

(52) U.S. Cl.
CPC .......... *H04W 4/70* (2018.02); *H04W 4/005* (2013.01); *H04W 4/008* (2013.01); *H04W 4/80* (2018.02); *H04W 24/02* (2013.01); *H04W 52/0296* (2013.01); *H04M 2250/10* (2013.01)

(58) Field of Classification Search
CPC ............................. H04W 4/005; H04W 4/008
See application file for complete search history.

(56) References Cited

U.S. PATENT DOCUMENTS

| | | | | |
|---|---|---|---|---|
| 5,909,357 A | * | 6/1999 | Orr | G06F 1/16 361/679.46 |
| 2016/0079773 A1 | * | 3/2016 | Shinoda | H02J 5/005 320/108 |
| 2017/0094468 A1 | * | 3/2017 | Choi | H04W 4/023 |
| 2017/0201583 A1 | * | 7/2017 | Leyman | H04L 67/12 |

* cited by examiner

*Primary Examiner* — Tuan H Nguyen
(74) *Attorney, Agent, or Firm* — BelayIP Oy

(57) ABSTRACT

As sensor technology becomes more pervasive in our daily lives, an issue which arises is how to efficiently deal with the large volume of data created by these sensors. Typically, a sensor is capable of capturing far more information than is necessary for use in any given application. However, different types and amounts of data may be needed for different applications and different levels of accuracy at different times. Therefore, it is desirable that sensors are able to continue to collect comprehensive amounts of data and to send it to a unit which is able to optimize the data storage and transmission in order to reduce both upstream and downstream burdens caused by large sensor data volumes. Disclosed herein are several examples of communications devices. Communications devices can be modular, as shown, and/or stackable, as shown. An advantage to modular/stackable systems is that they can be easily customized to specific demands.

16 Claims, 5 Drawing Sheets

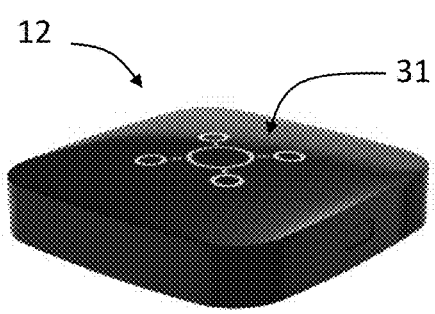
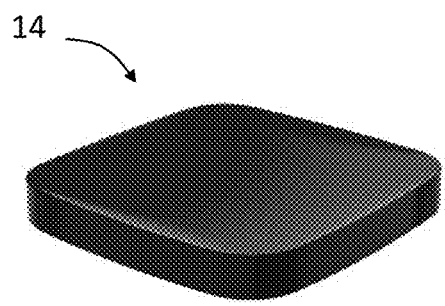
Fig. 3                                    Fig. 4
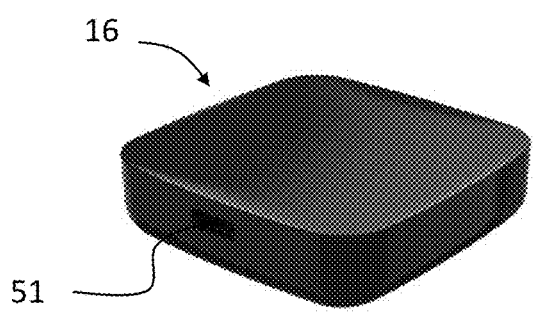
Fig. 5

STACKABLE COMMUNICATIONS DEVICE FOR SENSOR INFORMATION PROCESSING AND DELIVERY

FIELD OF INVENTION

The present invention relates to the field of sensor technology, in particular to a communications device for processing and relaying sensor data.

BACKGROUND OF INVENTION

It is becoming increasingly common to use sensors in daily life. Additionally, it is becoming more common to pair sensors with mobile phones. A problem that arises is that sensors create a large amount of data and storing, processing and transferring that data is resource intensive. For example, pairing several sensors and external devices to a mobile phone can easily drain the phone's battery and slow down the phone by using a significant portion of the phone's processing power. Additionally, there is a drive to make sensors smaller and lighter. It is difficult to achieve these goals while keeping processing power and information storage within sensors or mobile phones.

SUMMARY OF THE INVENTION

As sensor technology becomes more pervasive in our daily lives, an issue which arises is how to efficiently deal with the large volume of data created by these sensors. Typically, a sensor is capable of capturing far more information than is necessary for use in any given application. However, different types and amounts of data may be needed for different applications and different levels of accuracy at different times. Therefore, it is desirable that sensors are able to continue to collect comprehensive amounts of data and to send it to a unit which is able to optimize the data storage and transmission in order to reduce both upstream and downstream burdens caused by large sensor data volumes.

Disclosed is a stackable communications device for sensor information processing and delivery, said stackable communications device may comprise some or all of the following: a link device having a case and within the case having: at least one receiver for receiving sensor data from at least one external sensor; at least one transmitter for transmitting data over a wireless communications channel; a processor and memory for processing and storing received sensor data prior to transmission and a short term battery, wherein the memory of the link device has stored thereon computer readable instructions for optimizing at least one characteristic of received sensor data for transmission over the wireless communications channel, and the memory has storage capacity for storing raw received sensor data, wherein the case of the link device has a size and geometry such that the link device is portable and stackable with at least one additional unit of a stackable communications device, and at least one additional power unit which is separate from and stackable with the link device, wherein the at least one additional power unit has a case which has a size and geometry which is compatible with that of the case of the link device such that the link device can be stacked on the at least one additional power unit and the additional power unit is capable of powering the link device when stacked.

Additionally, according to certain embodiments there is at least one additional power units which is a battery, and wherein the battery is capable of powering the link device through inductive coupling when in a stacked configuration.

Still yet, according to certain embodiments there is at least one additional power unit which is a charging unit, wherein the charging unit has a power input for connecting to an external power source, and wherein the charging unit is capable of powering the link device and/or another power unit through inductive coupling when in a stacked configuration.

BRIEF DESCRIPTION OF THE DRAWINGS

FIG. 3 shows an example link device.

FIG. 4 shows an example auxiliary device.

FIG. 5 shows an example charging unit.

DETAILED DESCRIPTION OF EXEMPLARY EMBODIMENTS

As sensor technology becomes more pervasive in our daily lives, an issue which arises is how to efficiently deal with the large volume of data created by these sensors. Typically, a sensor is capable of capturing far more information than is necessary for use in any given application. However, different types and amounts of data may be needed for different applications and different levels of accuracy at different times. Therefore, it is desirable that sensors are able to continue to collect comprehensive amounts of data and to send it to a unit which is able to optimize the data storage and transmission in order to reduce both upstream and downstream burdens caused by large sensor data volumes.

Disclosed herein are several examples of communications devices. Communications devices can be modular, as shown, and/or stackable, as shown. An advantage to modular/stackable systems is that they can be easily customized to specific demands.

Figure 1:
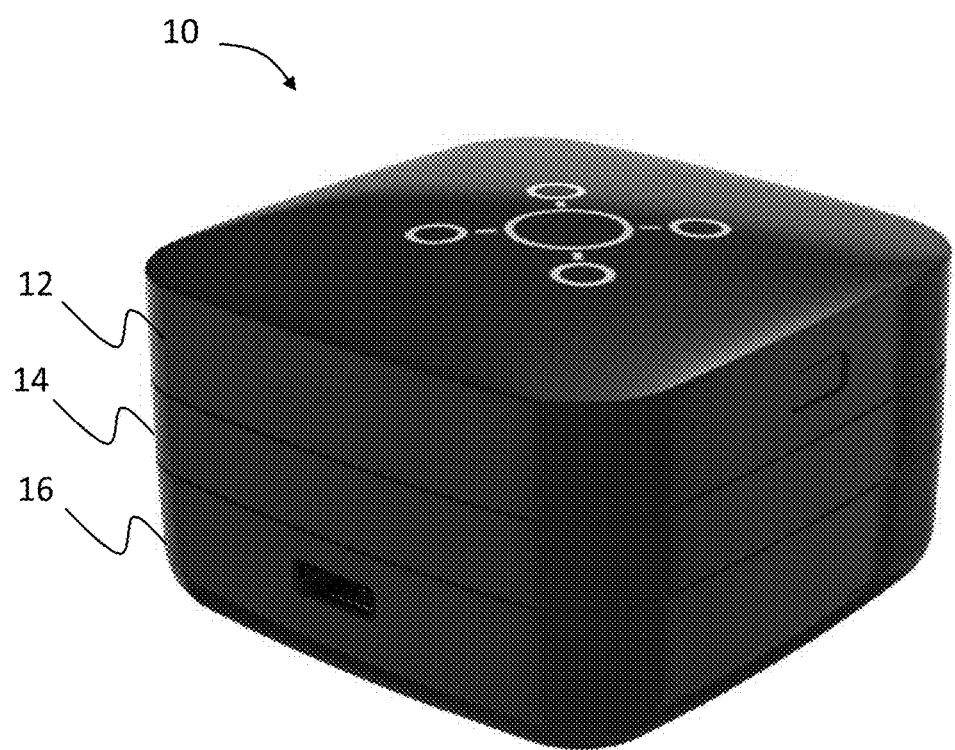
FIG. 1 shows an example of a stacked set of elements in a stacked communications device.
Figure 2:
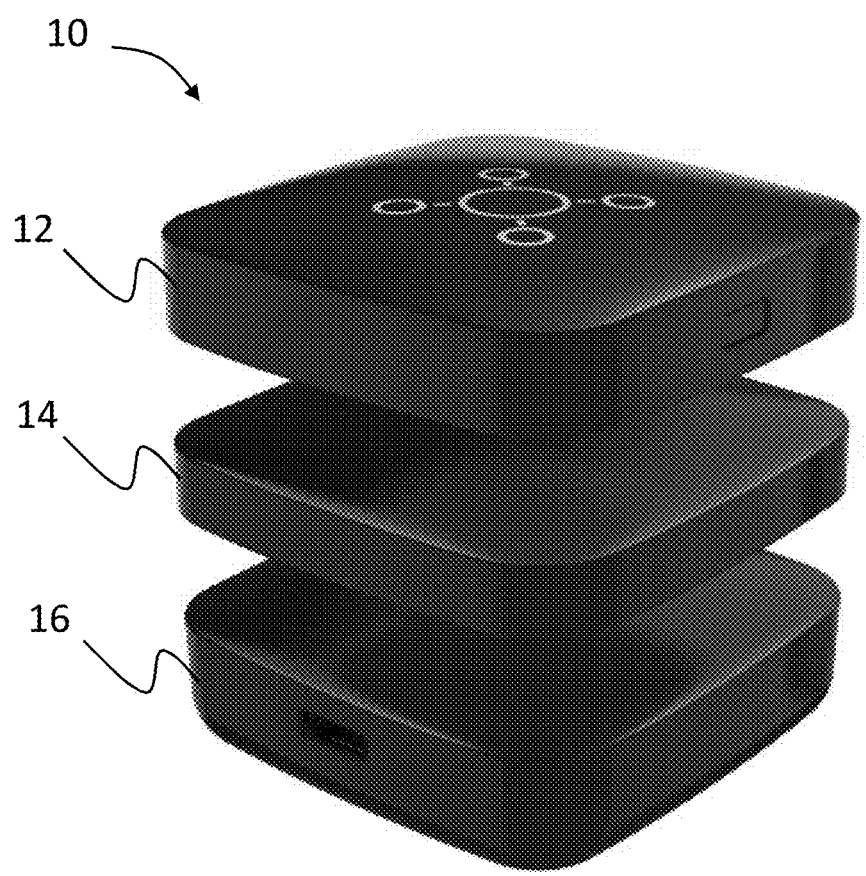
FIG. 2 shows the elements from FIG. 1 but separated from each other.

FIG. 1 shows an example of a modular and stacked communications device 10. The communications device 10 in FIG. 1 includes a link device 12, an auxiliary device 14 and a charging unit 16. Stackable and/or modular communications devices can comprise any combination of at least one link device and at least one other element, e.g. an auxiliary device or charging unit. The stackable communications device need not be stacked, but should be stackable, for example as shown in FIG. 2. Other modular arrangements are conceived where the modular elements need not be stacked in order to work but can be otherwise connected or arranged within an environment and work together as described with regards to the stackable embodiments herein. While the remainder of the disclosure discusses primarily stackable embodiments, the same knowledge, principles and disclosure relates in kind to other modular embodiments.

FIG. 3 shows an example of a link device 12. The link device 12 can be, for example, the top element in a stacked system. As such, it may contain a logo or identifier 31. The logo or identifier may be printed or it may be digital or otherwise luminous. Additionally, a screen can be provided in place of the logo 31.

The link device 12 can be specially configured to collect and process sensor data from one or more sensors. The link device 12 can also be specially configured to pass along raw and/or optimized sensor data to one or more additional devices which use the transmitted data.

A link device may have a case, as shown in the figures, and housed within the case a number of features. Examples of some features include: at least one receiver for receiving sensor data from at least one external sensor; at least one transmitter for transmitting data over a wireless communications channel; a processor and memory for processing and storing received sensor data prior to transmission and a short-term battery.

A short-term battery can have a capacity for operating the link device under a predetermined work load for a predetermined time-span. For example, the short-term battery can be selected such that under normal environmental conditions, the link device can be powered by the short-term battery for a span of, e.g. 12, 24, 36 or 48 hours, while monitoring 3-5 external sensors, processing their data and transmitting the processed data. As one of the key factors to the size and weight of consumer electronics in today's age is the battery capacity, selecting a battery size which is optimal such that it does not need to be charged many times within a day but also does not hinder the usability/portability of the device is useful.

As usage can vary significantly and therefore battery requirements can vary significantly, a system can include one or more auxiliary batteries. FIG. 4 shows an example of an auxiliary unit 14. Examples of auxiliary units are auxiliary batteries, hard drives, processing units, enhanced transmission units, enhanced reception units, auxiliary antennas, recording devices (such as a camera or microphone), auxiliary security devices and sensors. One of ordinary skill will recognize further auxiliary units which can be used in the systems disclosed herein and which do not depart from the scope of the present invention.

Figure 6A:
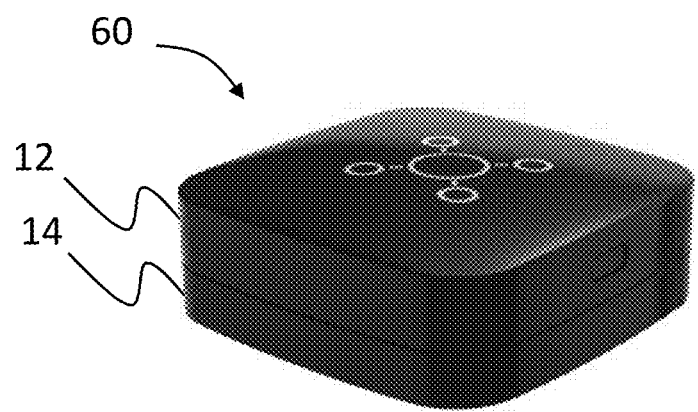
FIG. 6a shows an example of a stacked set of elements in a stacked communications device including a link device and an auxiliary device.

An auxiliary battery unit can be coupled to the link device, as shown in FIG. 6a, in order to extend the battery life of the link device. Similarly, an auxiliary hard drive can be coupled to the link device in the same way in order to extend the storage capacity of the link device.

Figure 6B:
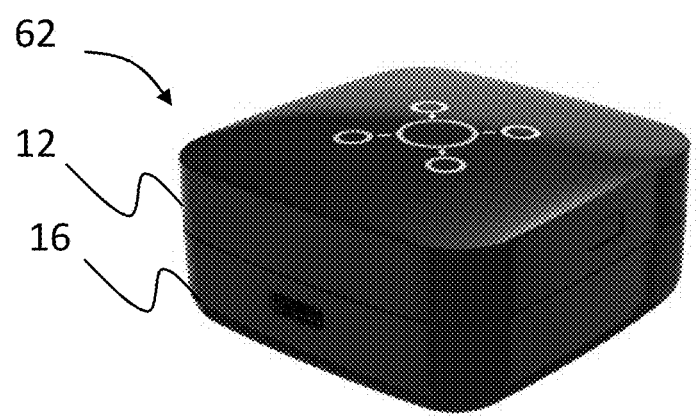
FIG. 6b shows an example of a stacked set of elements in a stacked communications device including a link device and a charging unit.
Figure 7:
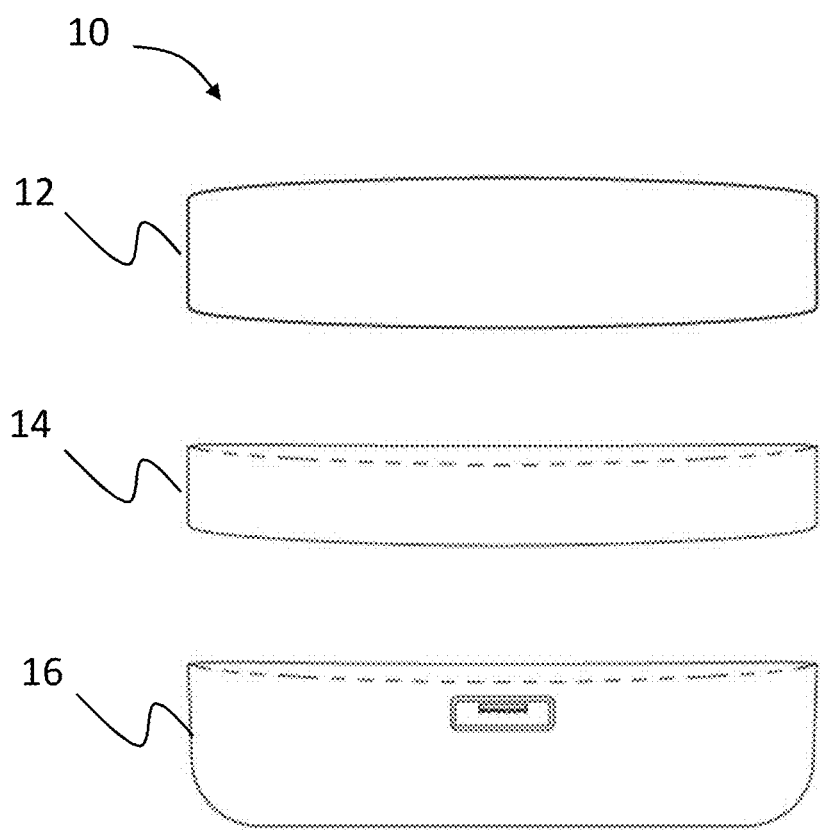
FIG. 7 shows a wire frame view of the elements from FIG. 2.

As long term use of any high consumption power electronic needs a charger/recharger, a charging unit 16, as shown in FIG. 5, can be added to a system. A charging unit 16 can include a power input 51, such as a DC in, a USB or other power input. The charging unit 16 may also include a power chord. A charging unit 16 can be coupled directly to a link device as shown in FIG. 6b. Similarly, A charging unit 16 can be coupled directly to one or more auxiliary units.

As can be seen clearly in FIGS. 1, 6a, 6b and 7, the case of the link device has a size and geometry such that the link device is portable and stackable with at least one additional device of a stackable communications device. Similarly, in stackable embodiments in particular the case of each of the elements is such that they can be easily stacked with other elements in the system, as shown.

The link device, any auxiliary device, charging unit and any other stackable elements of a stackable communications device can have cases with a top surface, a bottom surface and a side wall connecting the top and bottom surfaces and giving the element a thickness, as shown in the figures. The perimeters of the top and bottom surfaces of adjacent stackable elements can be essentially the same. For example, in the figures the perimeter of the bottom of the link device 12 matches with the perimeter of the top surface of the auxiliary device 14 and that of the perimeter of the top surface of the charging unit 16. Similarly, the perimeter of the top and bottom surfaces of the auxiliary device 14 match with the bottom and top surfaces of the link device and charging device respectively. In the figures, the link device is meant to be always the top unit and therefore can have a unique top surface which is not compatible with other surfaces of other elements. Additionally, the charging unit is meant to be on the bottom of a stack and may have additional elements, such as feet of some type, and thus be incompatible with other surfaces of other elements. However, stackable communications devices can be created where any element can be in any order and thus each top and bottom surface of each element should be compatible with another element's surfaces. Additionally, a stackable communications device can be created where there is a specific order of stacking and have thus more specific case geometries, e.g. in a pyramid.

The processor and memory of the link device can be specialized/optimized in order to handle reception, processing and transition of sensor data. For example, there may be stored thereon a link device specific operating system which is optimized for these tasks. According to certain embodiments, the idea of the communications device is to be an intelligent relay between sensors and downstream electronics. As such, the communications device may not need to use or display any information as such and may therefore have only the necessary electronics for efficiently receiving, recording, processing, optimizing, transmitting sensor data or a combination thereof.

The memory of the link device can have stored thereon computer readable instructions for optimizing at least one characteristic of received sensor data. The optimization can be for optimizing the transmission of data over a wireless communications channel. According to certain examples, a link device may include more than one transmitter for transmitting data. Different transmitters can be for transmitting data over different wireless communications channels. Optimizing and/or packaging of received sensor data for transmission can be such that it is optimized and/or packaged for transmission over a specific selected wireless communications channel. Additionally, the link device may be able to dynamically select the transmission means and/or receiving device and then automatically update how received sensor data is optimized and or packaged. For example, if the link device is connected to a user's mobile telephone through Bluetooth or NFC, the link device may thus optimize the received sensor data to send a minimal amount of data for a desired application and send it in a compressed format useable by the operating system of the mobile phone. If the link device then transitions to a Wi-Fi connection and is sending data directly to a server device, then the link device can send a greater amount of data, at a lower compression rate or even send e.g. bursts of raw data. One of ordinary skill will recognize other scenarios and ways of optimizing the disclosed system without departing from the scope of the present invention.

The memory of the link device can include computer readable instructions for accumulating sensor data from a plurality of sensors. This can be over a period of time, e.g. a continual period. The instructions may also include those for compressing raw or accumulated sensor data. The instructions may also include causing transmission, e.g. periodically, data, e.g. the compressed accumulated sensor data. The memory of the link device may also include computer readable instructions for storing raw received sensor data. The raw received sensor data can be stored for a predetermined length of time, regardless of additional processing or transmission of data from the link device.

As discussed above, the auxiliary device can be an additional power unit. A system may include one or more auxiliary devices. A system may include one or more additional power units, e.g. a charging unit and/or an auxiliary battery unit. The one or more additional power units and/or auxiliary devices can be separate from and stackable with another element or elements of the system, e.g. the link device. The additional power unit can have a case which has a size and geometry which is compatible with that of the case of the link device such that, e.g. the link device can be stacked on the at least one additional power unit and the additional power unit is capable of powering the link device when stacked.

Additional power units can be a battery or a charging unit. T additional power units can be capable of powering the link device, and/or another auxiliary device, through inductive coupling when in a stacked configuration. Similarly, the link device can be capable of powering an auxiliary unit from it's internal short-term battery through inductive coupling.

The link device, additional power units, auxiliary device and any other stackable elements can be capable of being magnetically coupled to each other in a stacked arrangement. Additionally, the different units of the system can be able to communicate with each other wirelessly. According to these examples there would be a minimal number of interfaces between the elements which lead to an increase in reliability of the system.

According to certain examples, the link device includes at least one, or a plurality of, sensors internally within the link device case. Examples of such sensors are an inertia sensor, a location sensor, velocity sensor, speed sensor, accelerometer, gyroscope, altimeter or barometer. Furthermore, one or more of said sensors can located in one or more auxiliary sensor units.

Furthermore, the link device and/or an auxiliary unit can include a GPS module. The memory of the link device can include computer readable instructions for determining the location of at least one external sensor in relation to the link device. This can be done, for example, from sensor data received from the external sensor. The link device can have instructions for then determining an actual location of the external sensor based on the GPS location of the link device and the determined location of the external sensor in relation to the link device.

A sensor collection system and/or a stackable communications device itself, can include one or more external sensors. These external sensors can be capable of transmitting sensor data to the link device wirelessly. They can also be capable of transmitting the sensor data to the link device directly, e.g. without a relay. Such external sensors may or may not be stackable as described above. Additionally, such external sensors may or may not be capable of being powered by one or more of the disclosed power sources/batteries/charging units described herein.

Security and privacy can also be concerns when it comes to the collection, processing and/or transmission of sensor data. The memory of the link device can include computer implementable instructions for being able to securely pair at least one external sensor with the link device. This secure pairing can be in a paired arrangement such that the transition of sensor data to the link device is secure. The memory of the link device can have stored thereon computer readable instructions for securely pairing the link device to a mobile phone. This secure pairing can be such that the link device can securely transmit optimized sensor data to the mobile phone. Furthermore, the link device, or any other element including any auxiliary units, charging unit or sensor units can include a hardwired unique ID. The hardwired unique ID can be integral within electronics of the link ID. Examples of such hardwired unique ID's can be found in U.S. application Ser. No. 14/631,602 "System and method for social platform based private social network" which is incorporated by reference in it's entirety herein.

According to certain examples, the top element of a stack, e.g. the link device, works as communication device during daily activities; it can have some or all of: Ble, Wi-Fi, LTE data connectivity, a GPS module, an inertia module, a powerful processor and several, e.g. 2, 4, 8, 16+ gigabytes of memory. The link device can work as follows; it can gather data from one or more sensors. It can store that data until the data is either necessary, desired or optimal to upload to a device and/or backend server.

Sensor data can be very draining on system resources. Therefore, the link device can essentially crunch different sensor data into optimal, e.g. proprietary format, in which the data can be faster and more effectively delivered around a bigger system. This can reduce expensive processing time on backend servers. It can also let each user locally handle the crunching of the data on one or more of their own link devices. The link device can also reduce data usage, e.g. on LTE or Wi-Fi, as the data can be optimized before sending. This can save both money and resources for users, particularly in countries like US where data plans on phones are expensive.

Crunching/processing data on the link device also saves users' phone battery if the sensor data would have otherwise been sent directly to a phone. This is because sensor data can be seen as heavy for the electronics of a phone when the phone is already performing a variety of other tasks.

A middle device in a stacked arrangement, e.g. the auxiliary device, can work as an additional battery. For example, it can be clipped magnetically to link device and allows the device to operate for substantially longer than the internal short-term battery, e.g. up to 4-6+ days.

A bottom device in a stacked arrangement can be a charger unit. The charging unit can accept devices on top of it in any order and charges/powers some or all of them either directly and/or indirectly. The charger can be powered with a USB input.

The link device can also provide some or all of: basic location, speed, acceleration, attitude, altitude, barometric pressure and inertia data about a user and/or the link device itself. This information can also be provided to other sensors. As such, other sensors can triangulate their position relative to the device very accurately. This generates microlocation awareness for each individual sensor/unit in a mesh.

The link device can be a platform having it's own operating system, e.g. similar to a mobile phone but customized for dealing with large volumes of data. The link device can also be used similarly as discussed with sensors also with a user's other peripheral devices. These peripheral devices can connect through the link device for data connectivity, data optimization and data storage. Currently all of a user's periphery devices which are connected to a phone are burden to the phone battery, processing power and connectivity. Therefore, by first connected a periphery device to a link device as disclosed herein, and further connecting the link device to a mobile phone, then the data associated with the periphery device, i.e. anything that can be currently connected to a mobile phone wirelessly and which generates and/or relays data, can be optimized and compressed before reaching the mobile phone, thereby increasing the available resources of the phone to focus on more user important activities.

According to certain embodiments, a stackable system has three elements, the link device, the auxiliary battery and the charging unit. The link device is optimized such to be able to be carried around and used during daily activities to collect data. Therefore it can be designed to be light and small, an autonomous device which is not a burden to carry around and used. Battery life can be sufficient for full day of use. However, to keep the link device light, having a sufficient battery for around one days uses limits long term usability.

Therefore, an additional magnetically attachable battery allows users to use the link device over, e.g. a long weekend such as when hiking, or boating, so they would have power through a longer trip with the additional battery.

The bottom charging unit can be a wireless charger for the above elements. The charging unit, or other designated bottom unit, can function as a platform to clip the device to a desired surface. For example, if a user wants to leave the link device to communicate sensor data from their summer house, boat or RV, they can clip or otherwise attach designated bottom unit, e.g. charging unit, to a wall or surface there and power up the system without need for batteries or charging. The charging unit can keep all of the stacked devices fully charged and ready to take with you.

Furthermore, such systems as described herein can be used to allow live streaming of sensor data. Sensors can be designed as small as possible with small batteries, small processors (if any), and small memories (if any). Then they can send all of the data to a link device where the storage and processing takes place on a localized device, rather than having all of those components on each of a plurality of sensors in a single or integrated system. The Link devices and systems described herein therefore enable powerful processors, huge memory and big battery life for the whole system. This allows things such as streaming live data on fast phased activities such as Formula Karting races which takes a huge amount of processing power and battery for current individual sensors.

Furthermore, there can be a non-transitory computer readable medium having stored thereon a set of computer readable instructions for causing a processor of a computing device to carry out the methods and steps described above.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A stackable communications device for sensor information processing and delivery, said stackable communications device comprising:
   a link device having a case and within the case having: at least one receiver for receiving sensor data from at least one external sensor; at least two transmitters for transmitting data over different wireless communications channels; a processor and memory for processing and storing received sensor data prior to transmission, a short term battery, and wherein the memory of the link device includes computer readable instructions for optimizing and packaging received sensor data for transmission over a specific selected wireless communications channel,
   wherein the memory of the link device has stored thereon computer readable instructions for optimizing at least one characteristic of received sensor data for transmission over the wireless communications channel, and the memory has storage capacity for storing raw received sensor data,
   wherein the link device includes a GPS module, and wherein the memory of the link device includes computer readable instructions for determining the location of at least one external sensor in relation to the link device from sensor data received from the external sensor, and to determine an actual location of the external sensor based on the GPS location of the link device and the determined location of the external sensor in relation to the link device, and
   wherein the case of the link device has a size and geometry such that the link device is portable and stackable with at least one additional unit of a stackable communications device.

2. The stackable communications device according to claim 1, wherein one of the additional power units is a battery, and wherein the battery is capable of powering the link device through inductive coupling when in a stacked configuration.

3. The stackable communications device according to claim 1, wherein one of the additional power units is a charging unit, wherein the charging unit has a power input for connecting to an external power source, and wherein the charging unit is capable of powering the link device, another power unit, or both through inductive coupling when in a stacked configuration.

4. The stackable communications device according to claim 1, further comprising at least one stackable sensor unit, wherein the sensor unit has a case with a size and geometry which is compatible with that of the case of the link device.

5. The stackable communications device according to claim 1, further comprising an additional hard drive unit, wherein the additional hard drive unit has a case with a size and geometry which is compatible with that of the case of the link device.

6. The stackable communications device according to claim 5, wherein the memory of the link device further comprises additional computer implementable instructions for being able to securely pair at least one external sensor with the link device in a paired arrangement such that the transition of sensor data to the link device is secure.

7. The stackable communications device according to claim 1, further comprising a plurality of external sensors which are capable of transmitting sensor data to the link device.

8. The stackable communications device according to claim 1, wherein the link device further includes at least one sensor within the link device case.

9. The stackable communications device according to claim 8, wherein the sensor within the link device case is an inertia sensor, a location sensor, velocity sensor, speed sensor, accelerometer, gyroscope, altimeter or barometer.

10. The stackable communications device according to claim 1, wherein the memory of the link device includes computer readable instructions for accumulating sensor data from a plurality of sensors over a continual period of time, compressing the accumulated sensor data and periodically transmitting the compressed accumulated sensor data.

11. The stackable communications device according to claim 10, wherein the memory of the link device includes computer readable instructions for storing raw received sensor data for a predetermined length of time, regardless of additional processing or transmission of data from the link device.

12. The stackable communications device according to claim 1, wherein the link device, at least one additional power unit and any other stackable elements of the stackable communications device are capable of being magnetically coupled to each other in a stacked arrangement.

13. The stackable communications device according to claim 1, wherein the link device, at least one additional power unit and any other stackable elements of the stackable communications device all have cases with a top surface, a bottom surface and a side wall connecting the top and bottom surfaces and giving the element a thickness; wherein the perimeters of the top and bottom surfaces of adjacent stackable elements are essentially the same.

14. The stackable communications device according to claim 1, wherein the memory of the link device has stored thereon computer readable instructions for securely pairing the link device to a mobile phone such that the link device can securely transmit optimized sensor data to the mobile phone.

15. The stackable communications device according to claim 1, wherein the link device includes a hardwired unique ID, wherein the hardwired unique ID is integral within electronics of the link ID.

16. The stackable communications device according to claim 1, further comprising at least one additional power unit which is separate from and stackable with the link device, wherein the at least one additional power unit has a case which has a size and geometry which is compatible with that of the case of the link device such that the link device can be stacked on the at least one additional power unit and the additional power unit is capable of powering the link device when stacked.

\* \* \* \* \*